April 20, 1926.　　　F. A. HUGO　　　1,582,012

ELECTRIC BATTERY

Filed Dec. 14, 1921

INVENTOR:
Frank A. Hugo,
BY A. L. Ferrill
His ATTORNEY

Patented Apr. 20, 1926.

1,582,012

UNITED STATES PATENT OFFICE.

FRANK A. HUGO, OF EDGEWOOD BOROUGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

ELECTRIC BATTERY.

Application filed December 14, 1921. Serial No. 522,247.

*To all whom it may concern:*

Be it known that I, FRANK A. HUGO, a citizen of the United States, residing at Edgewood Borough, in the county of Allegheny and State of Pennsylvania, have invented certain new and useful Improvements in Electric Batteries, of which the following is a specification.

My invention relates to electric batteries, such for example as storage or secondary batteries, and particularly to the structure and method of assembling the parts of the battery at the points where the terminal posts project through the cell cover.

I will describe one form of battery structure, and one method of assembling the same, embodying my invention, and will then point out the novel features thereof in claims.

Figure 1:
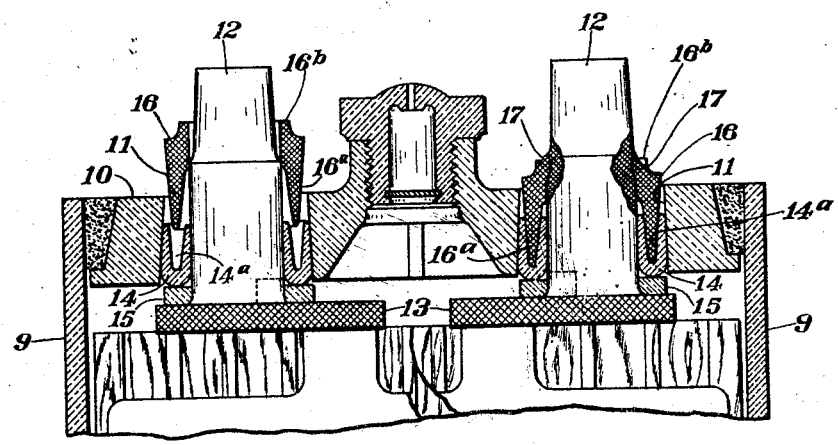
Figure 2:
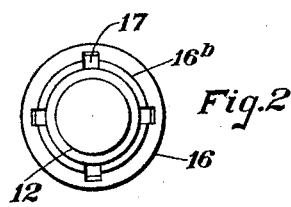

In the accompanying drawings, Fig. 1 is a view showing in vertical section one form of battery structure which embodies my invention and which is capable of being assembled in accordance with one method also embodying my invention. Fig. 2 is a top view of the right-hand terminal post 12 and the associated retaining sleeve 16 shown in Fig. 1.

Similar reference characters refer to similar parts in each of the views.

Referring first to Fig. 1, the battery comprises a cell or jar 9 provided with a cell cover 10. The cell cover has two vertical holes 11, 11, adapted to receive two terminal posts 12, 12, respectively, with considerable clearance. Each terminal post is integral with, or is attached to, a connecting strap 13, and one of these straps, is in electrical contact with all of the positive plates in the cell while the other strap is in similar contact with all of the negative plates in the cell, the plates of both polarities being assembled in the jar 9 in accordance with usual practice.

Located between each terminal posts 12 and the wall of the corresponding hole 11 is a sleeve-like gasket 14 of resilient material, such as soft rubber. This gasket rests on an annular gasket 15, which in turn lies flat on the top of the associated connecting strap 13. Each gasket 14 is provided with an annular recess 14ª which extends from the top well down towards the lower end of the gasket, so that the gasket constitutes in effect two concentric ring-like members connected at the bottom but not at the top.

Mounted on each post 12 is a retaining sleeve 16 the lower portion of which constitutes a circular wedge-like or V-shaped projection 16ª adapted to enter the recess 14ª in the gasket and so to spread the two members of the gasket against the post and the wall of the cell cover hole respectively with considerable pressure. The upper portion of each retaining sleeve preferably makes a driving fit on the post when the sleeve is forced down into place. The sleeves 16 are preferably of comparatively soft electro-conducting material, such as antimony lead, and in accordance with usual practice the two posts 12 are preferably of similar material. As here shown the upper end of each sleeve 16 is provided with a comparatively thin flange or collar 16ᵇ which fits snugly around the post when the sleeve is driven down into place.

The method of assembling the structure just described is as follows: The terminal posts 12, with the gaskets 15 in place, are first inserted in the holes 11, and the sleeves 16 are then placed on the posts and driven downwardly thereon to the position illustrated in the drawing. The structure thus serves to prevent the escape of electrolyte at the terminal holes, and at the same time provides a resilient connection between each post and the cell cover 10.

In Fig. 1, the left-hand sleeve 16 is shown in position ready to be driven down, and the right-hand sleeve is shown in its final position after the driving is completed.

The final step in assembling the structure is to lock the sleeve 16 in place on the post 12, and this is the step wherein lies my present invention. I accomplish this locking by forcing at least a portion of the sleeve 16 into the post 12; preferably the part of the sleeve which is thus pressed inwardly is the thin collar 16ᵇ, and, as here shown, this collar is forced into the post at four points 17 equally spaced around the circumference of the collar. (See Fig. 2.) Any suitable number of points may be chosen, however, or the entire sleeve may be forced into the post if desired. This locking may be accomplished by any suitable tool, but usually the sleeve will be driven down and the portions of the collar will be forced in by one and the same tool.

The sleeve 16 may be removed from post 12 by merely cutting off the collar 16ᵇ.

Although I have herein shown and described only one form of battery embodying my invention, and have explained only one method embodying my invention, it is understood that various changes and modifications may be made therein within the scope of the appended claims without departing from the spirit and scope of my invention.

Having thus described my invention, what I claim is:

1. The method of locking a retaining sleeve in place on the terminal post of an electric battery, which consists in providing one end of said sleeve with a comparatively thin flange, and forcing a portion of said flange into the post.

2. The method of locking a retaining sleeve in place on the terminal post of an electric battery, which consists in providing one end of said sleeve with a comparatively thin flange, and forcing said flange into the post at diametrically opposite points with a suitable compressing tool.

3. An electric battery comprising a cell cover provided with a hole, a terminal post projecting through said hole, a gasket of resilient material interposed between said post, and the wall of said hole, and a retaining sleeve carried by said post and engaging said gasket, a portion of said sleeve being forced into the post to hold the sleeve in place on the post.

4. An electric battery comprising a cell cover provided with a hole, a terminal post projecting through said hole, a gasket sleeved on said post and provided with an annular recess, and a retaining sleeve mounted on said post and projecting into said recess to force said gasket against the post and the wall of said hole, a portion of said sleeve being forced into the post to hold the sleeve in place on the post.

5. An electric battery comprising a cell cover provided with a hole, a terminal post projecting through said hole, a sleeve mounted on said post, and resilient sealing means located between said sleeve and said post and between said sleeve and the wall of said hole, a portion of said sleeve being forced into the post to hold the sleeve in place on the post.

In testimony whereof I affix my signature.

FRANK A. HUGO.